United States Patent [19]
Komuro

[11] Patent Number: 5,513,256
[45] Date of Patent: Apr. 30, 1996

[54] KEY TELEPHONE SYSTEM

[75] Inventor: Isaku Komuro, Kokubunji, Japan

[73] Assignee: Kabushiki Kaisha Toshiba, Kanagawa, Japan

[21] Appl. No.: 153,465

[22] Filed: Nov. 17, 1993

[30] Foreign Application Priority Data

Nov. 18, 1992 [JP] Japan .................. 4-308822

[51] Int. Cl.⁶ .................................................. H04M 1/00
[52] U.S. Cl. .................................................. 379/156
[58] Field of Search .................. 379/156–166, 379/201, 207

[56] References Cited

U.S. PATENT DOCUMENTS

| | | | |
|---|---|---|---|
| 4,517,409 | 5/1985 | Nagasaki | 379/156 |
| 4,559,417 | 12/1985 | Komuro et al. | 379/157 |
| 4,595,800 | 6/1986 | Nagatomi | 379/157 |
| 4,899,373 | 2/1990 | Lee et al. | 379/207 |
| 4,998,275 | 3/1991 | Braunstein | 379/164 |
| 5,027,345 | 6/1991 | Littlewood et al. | 370/58.2 |
| 5,247,571 | 9/1993 | Kay et al. | 379/207 |

FOREIGN PATENT DOCUMENTS 63-158953 1/1988 Japan .

Primary Examiner—Stephen Chin
Assistant Examiner—Kevin Kim
Attorney, Agent, or Firm—Finnegan, Henderson, Farabow, Garrett & Dunner

[57] ABSTRACT

A telephone system provided with a key service unit having ports to which terminal telephone sets are connected. The unit has a first memory having memory areas each for storing at least one customer data for each port; a second memory for storing the data temporarily; and a control section for transferring the data between the memory areas through the second memory. The data to be transferred is first transferred from the first memory to the second memory temporarily; secondly data stored in a transfer destination memory area of the first memory (for a port to which a terminal set is newly connected) is transferred to a transfer start memory area of the first memory at which the data to be transferred is originally stored (for a port to which the same terminal set is so far connected); and finally the data already transferred to the second memory is transferred to the transfer destination memory area (as a new port data of the newly reconnected terminal set).

10 Claims, 12 Drawing Sheets

| ITEM TERM. | PORT NO. | DATA AREA | SET NO. | DATA |
|---|---|---|---|---|
| 23a | P00 | 1 | FFFF | SPEED DIAL DATA, DISPLAY DATA |
| 23b | P01 | 2 | 00FF | SPEED DIAL DATA, DISPLAY DATA |
| 23c | P02 | 3 | 0000 | SPEED DIAL DATA, DISPLAY DATA |
| 23d | P03 | 4 | FF00 | SPEED DIAL DATA, DISPLAY DATA |

| ITEM TERM. | PORT NO. | DATA AREA | SET NO. | DATA |
|---|---|---|---|---|
| 23a | P00 | 1 | FFFF | SPEED DIAL DATA, DISPLAY DATA |
| 23b | P01 | 2 | 00FF | SPEED DIAL DATA, DISPLAY DATA |
| 23c | P02 | 3 | 0000 | SPEED DIAL DATA, DISPLAY DATA |
| 23d | P03 | 4 | FF00 | SPEED DIAL DATA, DISPLAY DATA |

FIG.13

```
CURRENT = 02
BEFORE = 00
```

| ITEM / TERM. | SPEED DIAL DATA |
|---|---|
| 23a | 8 5 3 6 2 5 F F F F F F F F<br>0 3 3 8 6 1 2 3 4 F F F F F<br>8 4 1 9 4 6 F F F F F F F F<br><br>F F ──────────────────▶ F |
| 23b | 0 4 2 5 1 1 1 1 1 F F F F F<br>0 4 2 6 2 3 1 2 3 4 F F F F<br>1 1 7 F F F F F F F F F F F<br><br>F F F F F F F F F F F F F F |
| 23n | F F ──────────────▶ F F<br><br><br><br>F F                F F |

30

KEY TELEPHONE SYSTEM

BACKGROUND OF THE INVENTION

1. Field of the Invention

The present invention relates to a key telephone system, and more specifically to a key telephone system by which telephone-related data (e.g., speed dial telephone numbers) stored therein and used before a terminal telephone set is moved can be used as they are even after having been moved.

2. Description of the Prior Art

In the key telephone sets, when the terminal telephone sets (referred to as terminal set, hereinafter) are moved in an office, for instance, it is necessary to change ports of a key service unit so that the terminal sets can be reconnected to corresponding ports thereof. In this case, when the ports are changed, since the customer data areas (referred to as data area, hereinafter) of a memory incorporated in the key service unit are different according to the terminal sets, the customer data (referred to as data, hereinafter) used before the terminal sets are moved cannot be used as they are after movement. Therefore, after the terminal sets have been moved, it has been so far necessary to rewrite data to be stored in the memory of the key service unit, thus causing a troublesome work for the users.

To overcome this problem, conventionally, the following apparatus as shown in FIGS. 1 to 3 has been proposed. In FIG. 1, a terminal set 10 is provided internally with dip switches 11 as shown in FIG. 2 to indicate an ID code allocated to the terminal set. Further, the key service unit is provided with an internal memory 12 as shown in FIG. 3. In FIG. 3, the memory 12 has data areas 13a to 13n corresponding to a plurality of terminal sets and ports. 13aa to 13nn corresponding to the respective data areas. Therefore, when a terminal set is connected to a port, the key service unit discriminates the ID code of the connected terminal set, and further enables the data stored in the data area corresponding thereto to be used. Further, when a terminal set connected to the port 13aa is moved and thereby reconnected to the port 13bb (vacant port), for instance, the key service unit discriminates the ID code of the moved terminal set, and further overwrite the data stored in the data area 13a in the data area 13b.

In the conventional method as described above, since the dip switches must be provided for the respective terminal sets, there exists a problem in that the cost thereof inevitably increases. In addition, since it has been necessary to set the ID codes of all the terminal sets with the use of the dip switches whenever the terminal sets have been installed, the setting work has been so far troublesome.

To eliminate the use of the dip switches, the following method has been known: the sequence that the terminal sets are disconnected from the key service unit is stored in the memory 12; and when the terminal sets are connected to the ports in accordance with the stored disconnection sequence, the key service unit recognizes the terminal sets and further overwrite the data in the new data areas. In this method, however, since it is necessary to correctly store the sequence that the terminal sets are extracted by the user, the installation work is also troublesome increasingly with increasing number of the terminal sets.

SUMMARY OF THE INVENTION

With these problems, in mind, therefore, it is the object of the present invention to provide a key telephone system by which various terminal-related data can be transferred simply and reliably whenever the terminal telephone sets are moved.

To achieve the above-mentioned object, the present invention provides a telephone system provided with a key service unit having a plurality of ports to which terminal telephone sets are connected, respectively, the key service unit comprising: a first memory having a plurality of memory areas each for storing at least one terminal-related data for each port; a second memory for storing the terminal-related data temporarily; and control means for transferring the terminal-related data between the plural memory areas of said first memory through said second memory.

The control means first transfers the data to be transferred from said first memory to said second memory temporarily; secondly transfers data stored in a transfer destination memory area of said first memory to a transfer start memory area of said first memory at which the data to be transferred is originally stored; and finally transfers the data already transferred to said second memory to the transfer destination memory area of said first memory.

Further, in response to a start signal transmitted by a terminal telephone set, said control means first transfers the data to be transferred from said first memory to said second memory temporarily; and in response to an end signal transmitted by the terminal telephone set, said control means transfers data stored in a transfer destination memory area of said first memory to a transfer start memory area of said first memory at which the data to be transferred is originally stored, and further transfers the data already transferred to said second memory to the transfer destination memory area of said first memory.

Further, the control means transfers the data to be transferred from said first memory to said second memory, in response to the start signal transmitted by the terminal telephone set, only when a data transfer enable signal is transmitted by a predetermined terminal telephone set.

Further, the control means disables the start signal transmitted by the terminal telephone, when a data transfer disable signal is transmitted by a predetermined terminal telephone set.

Further, the present invention provides, in a telephone system provided with a plurality of ports connected to terminal telephone sets and a plurality of memories for storing terminal-related data, a method of transferring terminal-related data between the memories, which comprises the steps of: transferring the terminal-related data to be transferred from a memory to another memory temporarily; transferring data stored in a transfer destination memory to a transfer start memory at which the data to be transferred is originally stored; and transferring the data temporarily transferred to the memory to the transfer destination memory.

BRIEF DESCRIPTION OF THE DRAWINGS

FIG. 13 is an illustration showing an example of the various data registration in the memory;

DETAILED DESCRIPTION OF THE PREFERRED EMBODIMENTS

Figure 1:
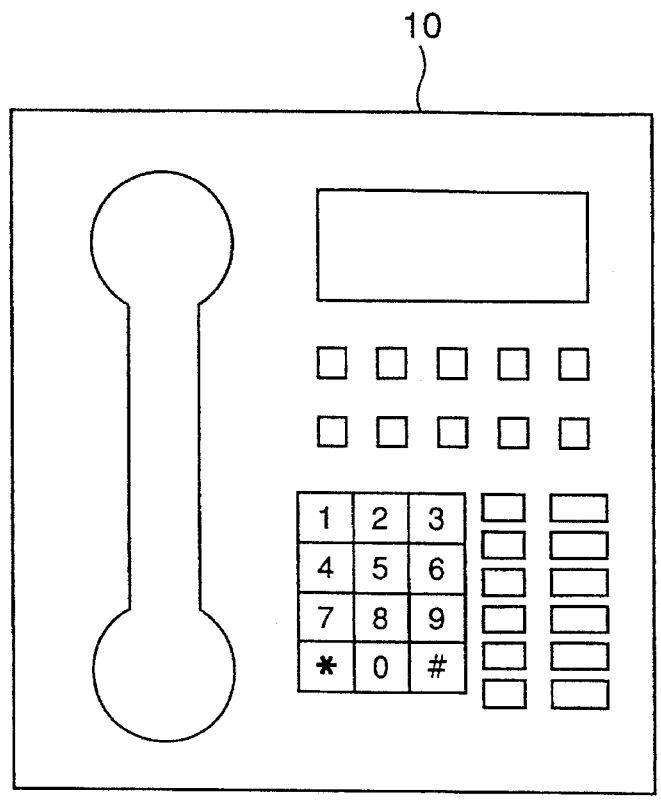
FIG. 1 is an external view showing a prior art terminal telephone set.
Figure 2:
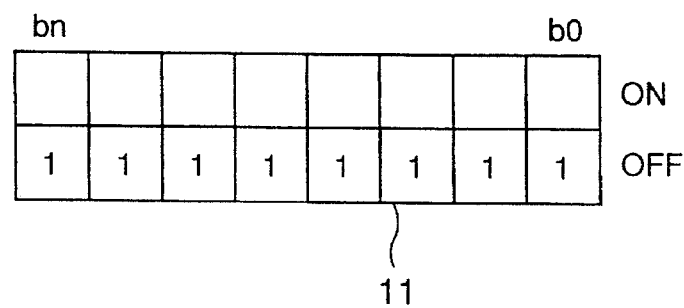
FIG. 2 is an illustration showing an example of prior art dip switches.
Figure 3:
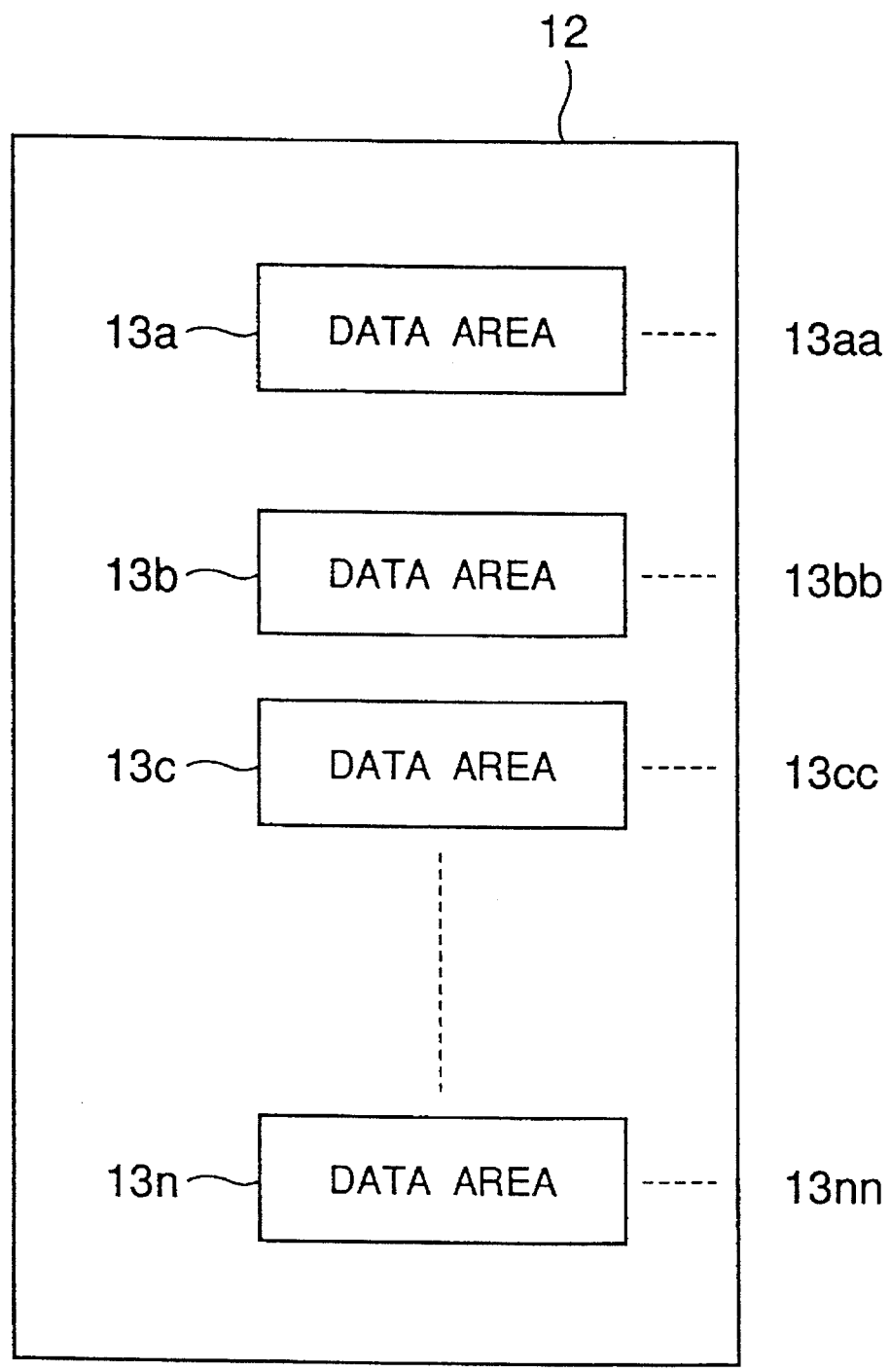
FIG. 3 is a view showing the relationship between memory data areas and ports.
Figure 4:
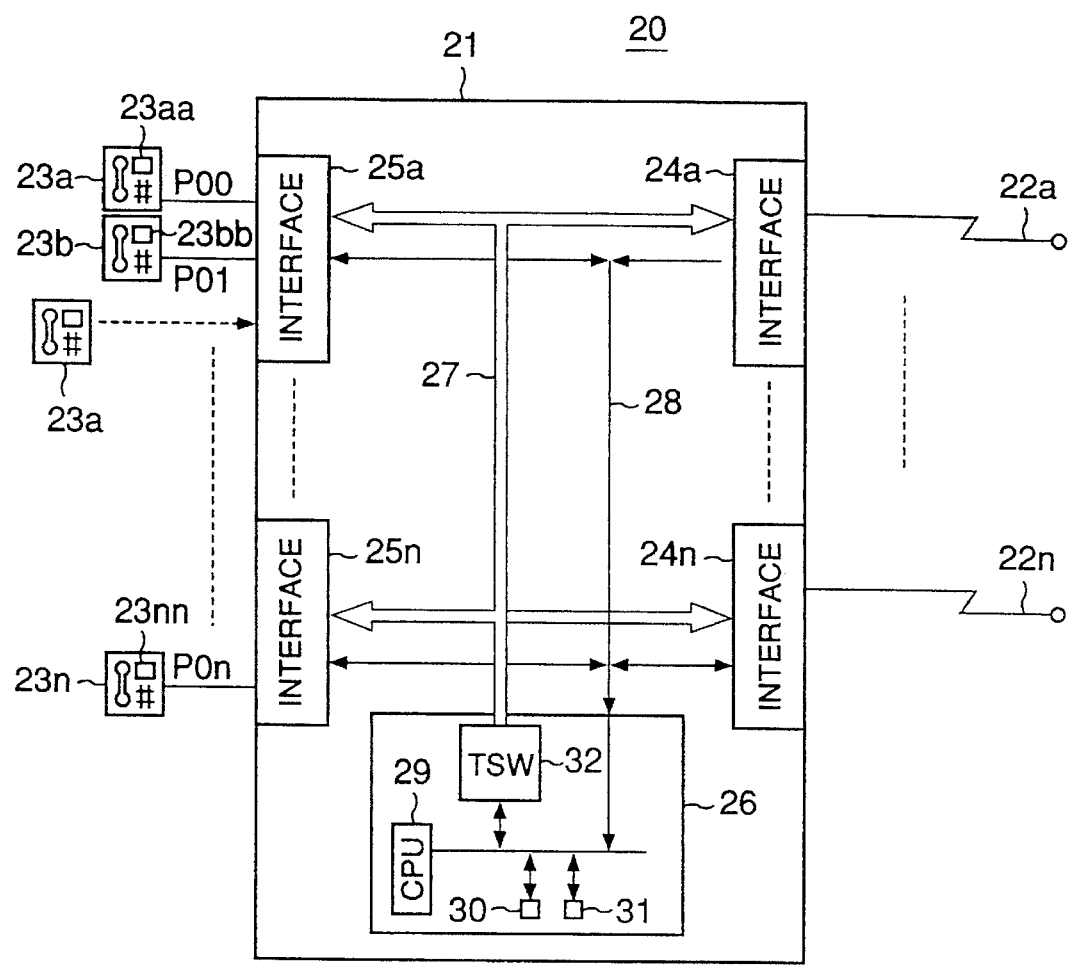
FIG. 4 is a schematic block diagram showing the key telephone system according to the present invention.

With reference to FIG. 4, the key telephone system 20 according to the present invention is composed of a key service unit 21, a plurality of office lines 22a to 22n connected to the key service unit 21, and a plurality of terminal telephone sets (referred to as terminal sets, hereinafter) 23a to 23n provided with display units 23aa Go 23nn, respectively.

The key service unit 21 is provided with office line interface circuits 24a to 24n, terminal interface circuits 25a to 25n, a control section 26, and a speech high way 27 and a data high way 28 both connected among the circuits, so that speech service can be made between the office lines and the terminal sets.

The control section 26 comprises an arithmetic processing unit (e.g., CPU) 29, a data memory (e.g., RAM) (a first memory) 30, a buffer memory (a second memory) 31, and a time switch (TSW) 32, etc. The arithmetic processing unit 29 receives control data transmitted through the data high way 28, executes necessary arithmetic processing, exchanges data between the data memory 30 and the buffer memory 31, and controls the time switches 32.

Figure 5:
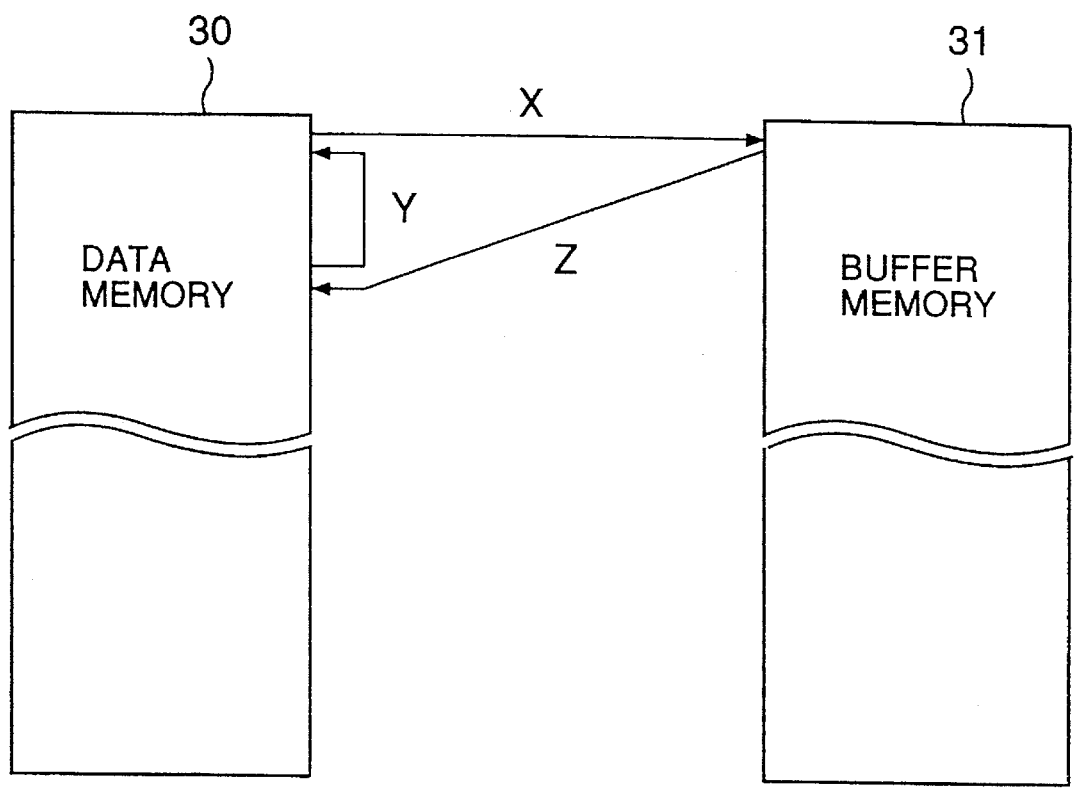
FIG. 5 is an illustration for assistance in explaining the data transfer between the memories provided in the key telephone system according to the present invention.

As shown in FIG. 5, the data memory 30 is connected to the buffer memory 31, and stores various data such as port data, speed dial data, display data, etc. processed by the arithmetic processing unit 29 under buffer action of the buffer memory 31. The time switch 32 is connected to the speech high way 27, and controls the connections between the office lines 22a to 22n and the terminal sets 23a to 23n.

The operation of the key telephone system 20 thus constructed will be described hereinbelow.

Figures 6, 7:
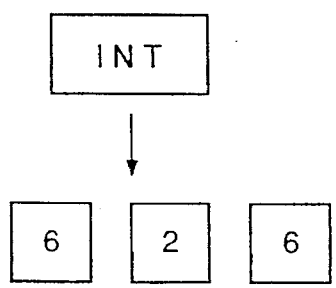
FIG. 6 is an illustration showing an example of various data registration to be stored in the memory.
FIG. 7 is a view showing an example of specific key operation.

In the ordinary telephone service, when a call accepting signal is transmitted from the office line 22a to the terminal set 23a for instance, the call accepting signal is transmitted to the arithmetic processing unit 29 of the control section 26 via the office line interface circuit 24a and the data high way 28. In response to the call accepting signal, the arithmetic processing unit 29 retrieves port data corresponding to a port number P00 of the terminal set 23a from the data stored in the data memory 30 as shown in FIG. 6. The retrieved port data are transmitted to the arithmetic processing unit 29 to control the time switch 32. The time switches 32 connects a call accepting sound generator (not shown) provided in the key telephone system 20 to the port P00 to generate a call accepting sound. Making a handset of the terminal set 23a connected to the port P00 off-hook generates the off-hook data which is sent to the arithmetic processing unit 29 via the interface 25a and the data high way 28. The arithmetic processing unit 29 halts the generation of the call accepting sound, so that the call service can be achieved between the office line 22a and the terminal set 23a.

The case where the terminal set 23a is moved from the port P00 to another port P02, for instance will be described hereinbelow:

To move the terminal set 23a, first data indicative of terminal set movement start is transmitted from the terminal set 23a to be moved to the key service unit 21 before movement. This movement start data (start signal) is data obtained when the internal (INT) key and then dial keys 6, 2 and 6 are depressed, as shown in FIG. 7.

Figure 8:
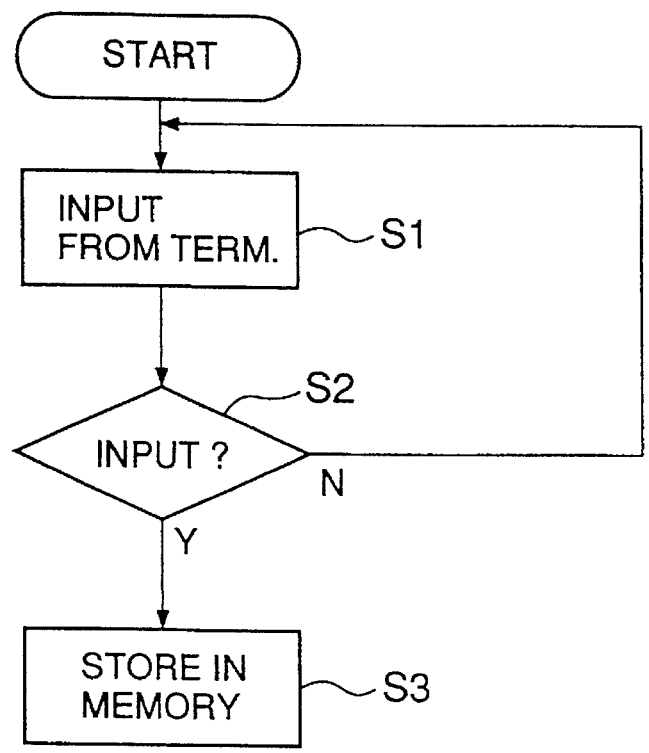
FIG. 8 is a flowchart for assistance in explaining the operation of the key service unit.

The movement start data setting and transmitting processing will be described hereinbelow with reference to the flowchart as shown in FIG. 8.

When the internal key (INT) and dial keys 6, 2, 6 are depressed to input a start signal from a terminal set (in step S1). Then, the movement start data (start signal) obtained by the key depression is transmitted to the arithmetic section 29 of the control section 26 via the terminal interface circuit 25a and the data highway 28. When the movement start data is inputted to the arithmetic processing unit 29 (in step S2), the arithmetic section 29 transfers data (such as port data stored in the first data area corresponding to the terminal set 23a, as shown in FIG. 6) to the buffer memory 31 as shown by an arrow X in FIG. 5 (in Step S3).

Figure 9:
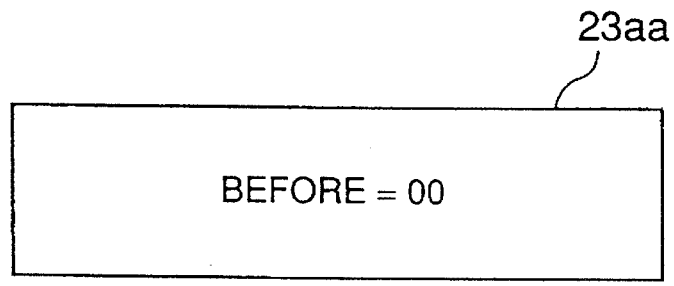
FIG. 9 is an illustration showing an example of display on the terminal telephone set.

Further, in this case, the movement start data is transmitted from the arithmetic processing unit 29 to the display section 23aa of the terminal set 32a via the data highway 28 and the terminal interface circuit 25a to display the transmitted data, as shown in FIG. 9.

Figure 10:
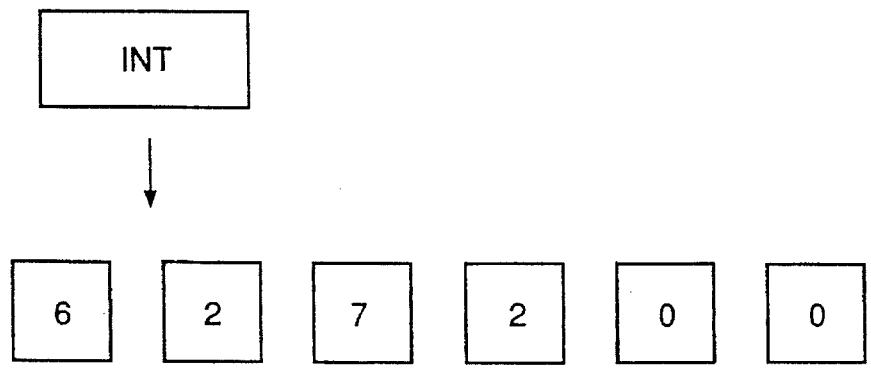
FIG. 10 is an illustration for assistance in explaining an example of specific key operation.

After the movement start data has been confirmed on the display section 23aa of the terminal set 23a as described above, the terminal set 23a is extracted from the port P00, and then reconnected to another port P02 to which the terminal set 23a is moved. Thereafter, data indicative of the a terminal movement end is transmitted from the terminal set 23a to the key service unit 21. This movement end data (end signal) is obtained by depressing the internal key (INT), the dial keys 6, 2, 7 and further the dial keys 2, 0, 0 indicative of an internal terminal set number which has been set to the former port P00 of the terminal set 23a, for instance as shown in FIG. 10.

Figure 11:
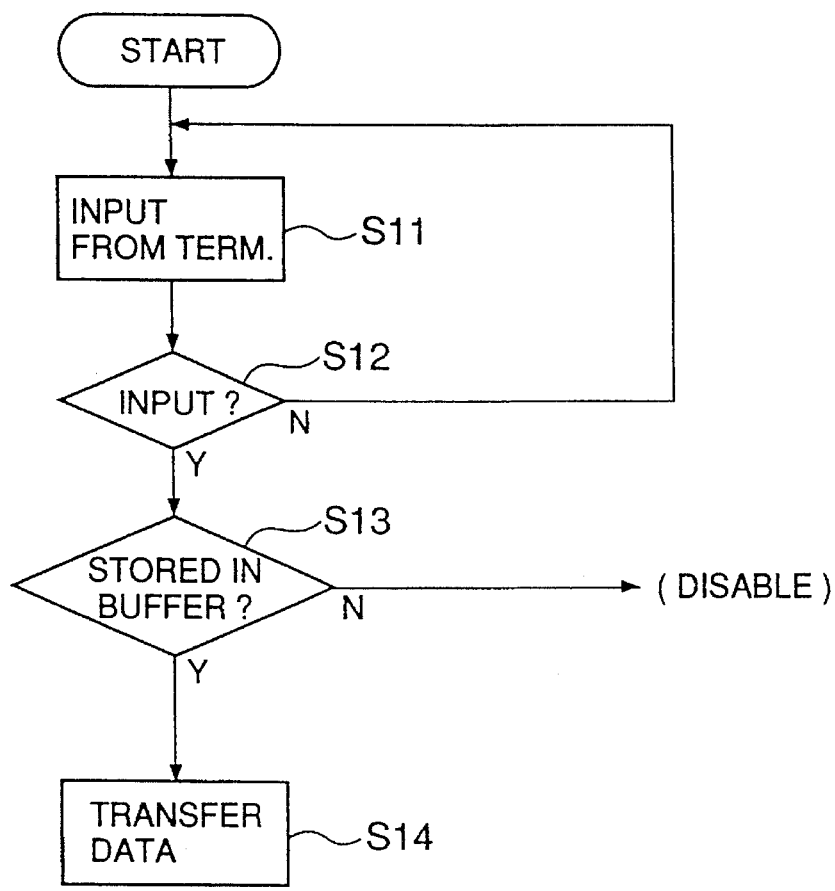
FIG. 11 is a flowchart for assistance in explaining the operation of the key service unit.

The process of setting and transmitting the movement end data will be described hereinbelow with reference to the flowchart shown in FIG. 11.

First, the internal key (INT) and the dial keys 6, 2, 7 and 2, 0, 0 of the terminal set 23a are depressed to input an end signal from the terminal set (in Step S11). By this key depression, the movement end data (end signal) is transmitted to the arithmetic processing unit 29 of the control section 26 via the terminal interface circuit 25a and the data highway 28. When the arithmetic processing unit 29 detects the movement end data (in Step S12), and confirms that the data stored at the first data area has been transferred to the buffer memory 32 (in Step S13). If not confirmed, however, the arithmetic processing unit 29 (referred to as control, hereinafter) allows the data relocation to be disable. If the data store in the buffer has been confirmed, control executes the data relocation (transfer) (in Step S14).

The process of relocating the data for the terminal set 23a stored in the buffer memory 31 to the third data area corresponding to the port P02 will be described hereinbelow with reference to the flowchart shown in FIG. 12.

Figure 12:
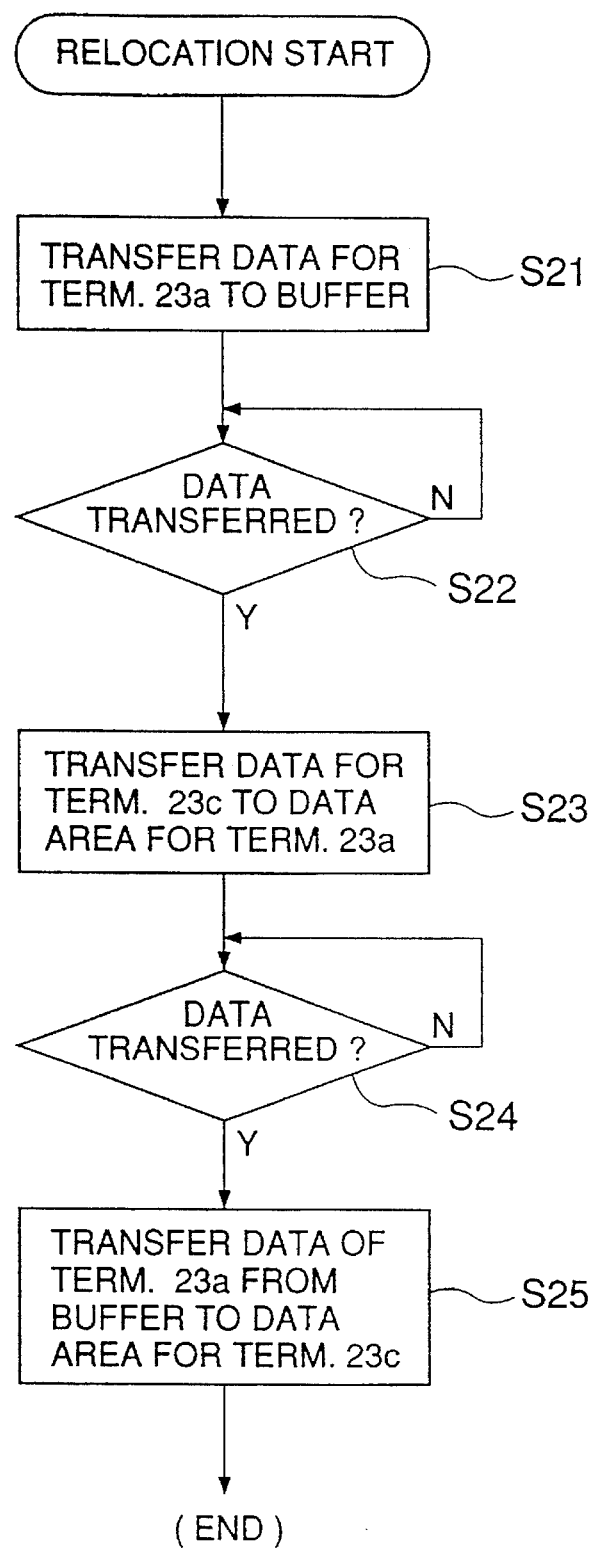
FIG. 12 is a flowchart for assistance in explaining the data transfer.

In FIG. 12, as described above, the data of the first data area for the terminal set 23a is transferred to the buffer memory 31 (in Step S21). When control confirms that the data has been transferred to the buffer memory 31 (in Step S22), control reads another data for another terminal set 23c stored in the third data area of the data memory 30, and stores the read data in the first data area for the terminal set 23a, as shown by an arrow Y in FIG. 5 (in Step S23). Further, control confirms whether the data for the terminal set 23c has been transferred to the first data area for the terminal set 23a (in step S24).

Thereafter, the data for the terminal set 23a once transferred to the buffer memory 31 is transferred again to the third vacant data area (for the terminals set 23c) as shown by an arrow Z in FIG. 13 and a dot line shown in FIG. 13, ending the processing (in Step S25). The terminal set movement condition is displayed on the display section 23aa of the terminal set 23a, as shown in FIG. 14, in the form of ports obtained before and after (now) movement.

After the terminal set 23a has been moved to the port P02, as described above, when a call accepting signal is transmitted from the office line 22a to the terminal set 23a, the arithmetic processing unit 29 retrieves the port P02 for the terminal set 23a. On the basis of the retrieved result, the time switch 32 connects the office line 22a to the port P02 to generates a call accepting sound.

One embodiment by which speed dial telephone number data set by the terminal set 23a connected to the port P00 is transferred to the terminal set 23a moved to the port P02 will be described hereinbelow.

Figures 14, 15:
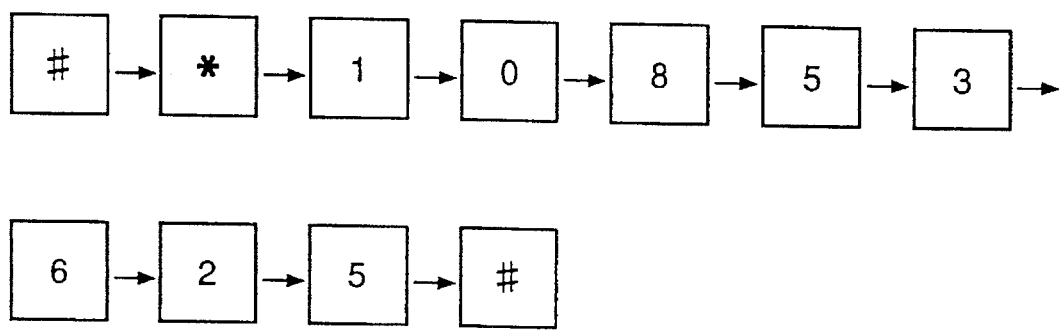
FIG. 14 is an illustration showing an example of display on the terminal telephone set.
FIG. 15 is an illustration for assistance in explaining an example of specific key operation.

First, a telephone number 85-3625 is registered in the form of a speed dial number, as shown in FIG. 15. In more detail, the dial keys # and * of the terminal set 23a are depressed to set an abbreviating number setting start; then the keys 1, 0 are depressed as a first abbreviated address; the keys corresponding to a telephone number 85-2625 to be abbreviated are depressed; and finally the key * is depressed to set an abbreviating number setting end.

Figures 16, 17:
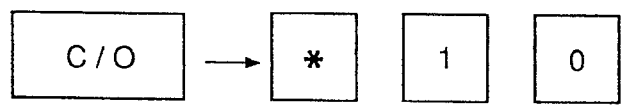
FIG. 16 is an illustration showing an example of various data registration to be stored in the memory.
FIG. 17 is a view showing an example of specific key operation.

In the same way as above, other abbreviated addresses 11, 12, ..., can be registered to the data memory 30, as shown in FIG. 16.

In use of the registered speed dial telephone numbers, when a call is required from the terminal set 23a to the telephone number 85-3625, the keys are depressed in the order of the office line key c/o, the abbreviating key *, and the abbreviated address key 10. By doing this, the key service unit 21 calls the telephone number 85-3625 through the controlled and selected office line for call originating.

In the case where the terminal set 23a to which the speed dial numbers are registered as described above is moved from the port P00 to the port P02, it is possible to make a telephone call from the terminal set 23a moved to the port P02 on the basis of the speed dial number, in accordance with the operation as explained with reference to FIGS. 5 to 12.

Further, in the above-mentioned embodiment, the transfer of various data between the data areas has been explained by taking the case where the terminal set is moved between the ports. In practice, however, it is also possible to transfer various data between the terminal sets, by inputting movement start and end data through the terminal set, without actually moving the terminal sets. For instance, when a speed dial number data registered in one terminal set is transferred to the other terminal set, it is possible to make a telephone call by use of a speed dial telephone number from the terminal set to which the speed dial number data have been transferred.

In this case, however, when a plurality of data such as speed dial telephone numbers registered by an individual can be used in common through a plurality of terminal sets, there arises a problem in that secret information may be leaked out. To overcome this problem, it is necessary to permit the data to be transferred to the other terminals sets, only when a permit signal is transmitted by the terminal set for a telephone manager. The embodiment as described above will be described hereinbelow.

Figure 18:
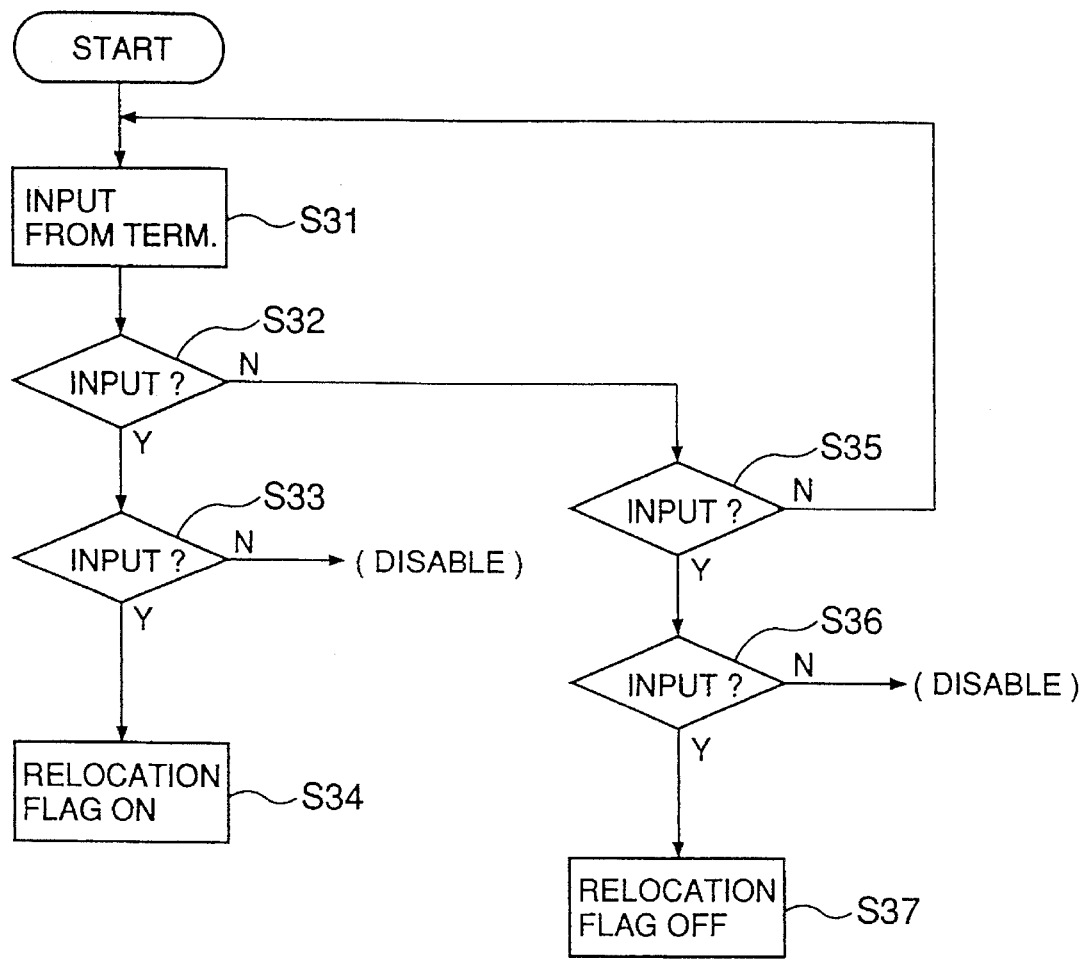
FIG. 18 is a flowchart for assistance in explaining the operation of the key service unit.

FIG. 18 shows a flowchart for assistance in explaining the data transfer enable/disable processing.

Where a data transfer request is given from another terminal set user to a telephone manager, the manager transmits a permit or non-permit signal from his terminal set 23n. For instance, the manager depresses the internal key (INT) and then dial keys #6283, if he permits the data transfer; but the internal key (INT) and dial keys #6281, if he does not permit the data transfer (in Step S31). Date obtained by depressing these keys is transmitted to the arithmetic processing unit 29 of the control section 26 via the terminal interface circuit 25n and the data highway 28.

When control discriminates that the transmitted data is a permit data (INT, #6283) (in Step S32), control further checks whether the terminal set from which the permit data is transmitted is the terminal set 23n for the telephone manager (in Step S33). If control discriminates that the permit data is not transmitted from the terminal set 23n, control disables the data transfer permission. If controls discriminates that the data is transmitted from the terminal set 23n, control turns on the flag (flag content: FF) of RAM (not shown) in the control section 26 and enables the data transfer (in Step S34).

On the other hand, when control discriminates that the transmitted data is not permit data (INT, #6283) (in Step S32), control discriminates whether the transmitted data is a non-permit data (INT #6281) (in Step S35). When control discriminates that the data is a non-permit data, control further checks whether the terminal set from which the non-permit data is transmitted is the terminal set 23n for the telephone manager (in Step S36). If control discriminates that the data is not transmitted from the terminal set 23n, control disables the data transfer non-permission. If controls discriminates that the data is transmitted from the terminal set 23n, control turns off the flag (flag content: 00) of the RAM (not shown) in the control section 26 and disables the data transfer (in Step 37).

As described above, in the telephone system provided with a key service unit having a plurality of ports to which terminal telephone sets are connected, respectively, the key service unit comprises: a first memory having a plurality of memory areas each for storing at least one terminal-related data for each port; a second memory for storing the terminal-related data temporarily; and a control section for transferring the terminal-related data between the plural memory areas of the first memory through the second memory.

Under control of the control section, the data to be transferred is first transferred from the first memory to the second memory temporarily; secondly data stored in a transfer destination memory area of the first memory is transferred to a transfer start memory area of the first memory at which the data to be transferred is originally stored; and finally the data already transferred to the second memory is transferred again to the transfer destination memory area of the first memory. Accordingly, it is possible to easily transfer various terminal-related data between the memories whenever the terminal telephone sets are moved. In addition, the terminal-related data can be used as they are after the terminal telephone sets have been moved.

Further, since the terminal-related data transfer can be processed in response to a movement start signal and a movement end signal transmitted by the terminal telephone set, the data can be transferred even when the terminal telephone set is not moved actually, so that various terminal-related data can be used in common by the users.

Further, the data transfer can be processed on the basis of a data transfer permit signal transmitted by a predetermined terminal telephone set (for a telephone manager) in addition to the movement start signal. When a data transfer non-permit signal is transmitted by the terminal telephone set for the telephone manager, the movement start signal is disabled, so that it is possible to prevent the terminal-related data of a plurality of terminal telephone sets from being used improperly.

Further, it is of course possible to modify the office lines, the terminal telephone sets, the movement data, etc. without departing from the scope of the present invention.

What is claimed is:

1. A telephone system including a key service unit having a plurality of ports coupled to a plurality of telephone sets, respectively, the key service unit, comprising:

first memory means having a plurality of memory areas, each memory area for storing data for a respective one of the plurality of ports, the data being for controlling the operation of a telephone set connected to the corresponding port;

second memory means for storing the data temporarily;

means for recognizing a certain signal transmitted by one of the telephone sets; and control means, responsive to the recognizing means, for transferring data to the memory area corresponding to the port connected to the one of the telephone sets, from the memory area corresponding to another port through said second memory means, the control means including means for transferring data from said first memory means to said second memory means, in response to a start-signal transmitted by a telephone set, subsequently transferring data stored in a transfer destination memory area of said first memory means to a transfer start memory area of said first memory means, in response to an end signal transmitted by the telephone set, and transferring the data already transferred to said second memory means to the transfer destination memory area of said first memory means.

2. The telephone system of claim 1, wherein said control means includes means for transferring data in response to the start signal transmitted by the telephone set, only when an enable signal is transmitted by a predetermined telephone set.

3. The telephone system of claim 1, wherein said control means includes means for disabling the start signal transmitted by the telephone, when a data transfer disable signal is transmitted by a predetermined telephone set.

4. The telephone system of claim 2, wherein the telephone set comprises display means for displaying at least one of a disconnected port and a newly connected port.

5. In a telephone system including a plurality of ports connected to telephone sets, a first memory means having a plurality of memory areas, each memory area for storing data for a respective one of the ports, the data being for controlling the operation of a telephone set connected to the corresponding port, and a second memory means for storing data temporarily, a method of transferring data, comprising the steps of:

recognizing a first signal transmitted by one of the telephone sets;

transferring, responsive to the first recognizing step, data to the second memory means from a memory area not corresponding to the port connected to the one of the telephone sets;

recognizing a second signal transmitted by the one of the telephone sets;

transferring, responsive to the second recognizing step, data from a transfer destination memory area to a transfer start memory area of said first memory means; and transferring the data in the second memory means to the transfer destination area of said first memory means.

6. The telephone system of claim 4, wherein the display means displays data corresponding to the start signal.

7. The telephone system of claim 6, wherein the telephone set transmitting the start signal comprises the display means.

8. The telephone system of claim 1, wherein the end signal is transmitted by the telephone set in response to data corresponding to a port to be disconnected from the telephone set.

9. The telephone system of claim 1, wherein, in response to the end signal and a signal indicating a disconnected port, the control means transfers the data stored in the transfer destination memory area of said first memory means to the transfer start memory area.

10. The telephone system of claim 1, wherein the data includes speed dial numbers.

* * * * *